June 1, 1937.    R. W. JOHNSON    2,081,932
AUTOMOBILE LAMP
Filed April 27, 1935
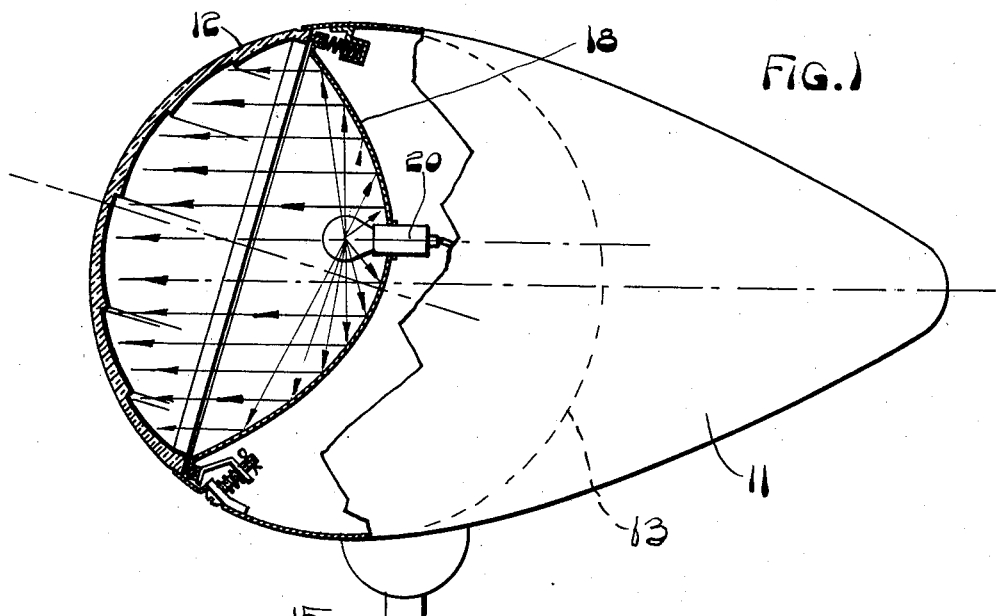
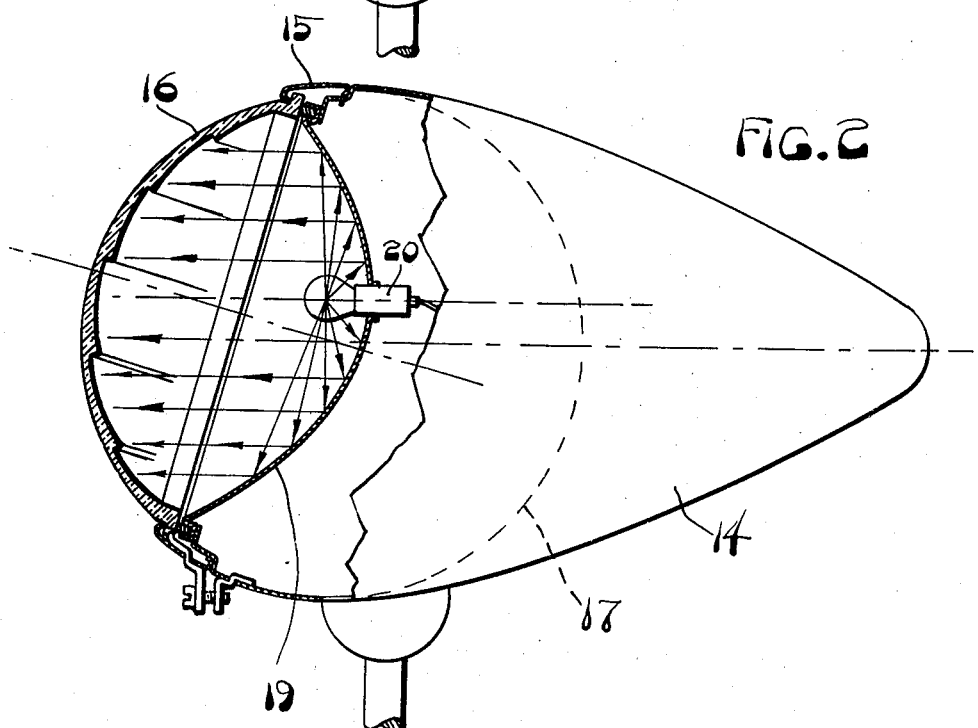
INVENTOR.
Roy W. Johnson
BY Bogert & Bogert
ATTORNEYS Patented June 1, 1937

2,081,932

UNITED STATES PATENT OFFICE 2,081,932

AUTOMOBILE LAMP

Roy W. Johnson, Wyoming, Ohio, assignor to The International Manufacturing Company, Cincinnati, Ohio, a corporation of Ohio Application April 27, 1935, Serial No. 18,679

2 Claims. (Cl. 240—41.3)

Automobiles of present design tend more and more to the so-called stream line ideal, in which the aim primarily is to eliminate air friction, drag, resistance, eddy currents and the like because of irregularities, extensions, angularities, and the like in surfaces of the automobile. In keeping with this thought, the lines of the forward structure of the automobile and including prominent elements, such as the radiator, windshield and the like have been designed with a backward slope adapted to aid in this easement of the wind resistance. Quite naturally, the influence of this stream lining has had its effect in the shape and appearance of minor details of the automobile structure other than as represented in major elements such as body, hood, radiator, cowl, windshield and fenders.

Lamps for automobile use, originally of substantial lantern shape with a bail, have evolved through various forms having a drum shaped body, to lamps having bullet shaped bodies, until at this time even the shape of the lens covering the front or open end of the body has been made to blend with that of the body to produce in effect a form resembling that of a drop of liquid as it falls freely through space, which design is commonly called the "tear drop". Although such present day lamps as a whole have the appearance of an element intended to form a part of the tout-ensemble of such stream line automobiles, there is, nevertheless, a weakness in the appearance as it is viewed critically. This weakness lies in the fact that the lamp of today, with its bullet shaped body and the bulged lens which closes the body, being made of different materials, discloses a line of demarcation at the juncture of the body and lens, which lens is vertical relatively to the horizontal axis of the lamp, and, which line is frequently found to have been emphasized by a plated metal trim or separate closure rim of plated or other finished metal.

My invention has for its principal object to so construct an automotive type lamp that the line of juncture or demarcation between the body and lens may be made to conform in slope or backward inclination with that of the radiator, windshield and other major elements of the vehicle so as to present a unified effect as of having been originally and intentionally designed to be a blending part of the entire stream lined structure. This is further strengthened by the object that I have devised a unique structure in which a well known geometric principle is incorporated to permit of the same and well known steps in manufacture, the same and well known types of lenses, and the same and well known lens mountings and closure devices as have been employed heretofore, all without increase in cost or added steps in the production of such a lamp.

These and other objects are attained in the automobile lamp described in the following specification and illustrated in the accompanying drawing, in which:

Fig. 1 is an elevational view, partially in section, showing an automobile lamp embodying my invention along lines of preference as to certain structural details.

Fig. 2 is an elevational view, partially in section, showing an automobile lamp embodying my invention along lines incorporating well known structural features.

The lamp shown in Fig. 1 is of the general type introduced by me in Patent Number 1,945,309 which was issued on January 30, 1934, but, as shown herein, has been made to include the novel feature now to be described. From several points of view for consideration, lamp openings and the lenses to occupy such openings, are most satisfactory when made truly circular or at least substantially so. Therefore, the following description is premised on the use of a lens which is circular and which fits a circular body opening. This circular form of both lens and body opening is advantageous from the standpoint of manufacture, both as to simplicity of operation, less expensive dies and tools for the forming of such body opening, and less expensive lenses, especially as to molds therefor, including the consideration that lenses of other than circular or substantially circular form are less satisfactory optically as well as being subject to constant strains both accidentally and internally, which always make an oddly shaped lens unsatisfactory because of variations of lamp temperature which result in cracking, because of strains set up in casting, because of strains set up in the acts of placing and removing the lens from the lamp, and because of the difficulty of creating the proper prismatic formations to obtain prescribed results as to light pattern projected.

To obtain a circular body opening which must be located at an angle inclined backwardly to the vertical plane in which such body openings are usually placed, involves a unique adaptation of the geometric principle that any section taken through a sphere will produce a circular outline. Since the usual lamp body is circular in any section normal to its axis it follows that any section therethrough taken at an angle other than normal to the lamp body axis, must be elliptical, unless the geometric principle stated is incorporated in the formation of the body. Therefore, I so form the body 11 of my improved lamp that its forward or open end and the material of the body lying immediately to the rear thereof and for an appreciable distance, will constitute a part of a sphere, the outline of which includes this forward part of the body, the lens 12, and the projected or dotted line 13 which has been included merely to show the spherical shape of this important feature of my invention. Obviously, the body opening, if made at any angle within this spherical portion of the body, must be truly circular.

Also, since this opening is circular, it is obvious that any lens of the same diameter and which has been designed for mounting within the same type of opening, will fit. I have found that the placement of this lens at an angle inclined backwardly from the vertical instead of in the vertical plane as has been standard practice, may be used without alteration as to prismatic formation for the reason that the characteristics of the light beam projected thereby as well as the light pattern produced by the beam are not altered as to total candle power of the beam and pattern or the distribution of light therein to meet the requirements of laws designed to regulate such matters. Obviously, this contributes materially in the prevailing desire to maintain and/or reduce costs in the production and marketing of lamps of designs in keeping with the variations of style dictated from season to season in the automotive industry.

In the event the lamp construction preferred is one in which the body 14, as shown in Fig. 2, is equipped with a separate part 15, commonly known as a door or closure rim, which element is provided as a means of mounting the lens 16 on the body, in any of the ways best known and approved as being suitable for the purpose, the body wall in a zone next adjacent thereto will constitute a portion of a sphere, the continuation of which spherical surface in projected form is shown in dotted line 17. Obviously, the lens 16, to be in keeping with this spherical motif of the design, should also have its surface formed to spherical curvature approximating that of the body zone mentioned, and the projected line 17, or any other shape.

I have not laid stress upon the means by which the respective reflectors 18 and 19 of the two forms of lamps disclosed, may be held within the lamp bodies shown, since this does not constitute any part of my invention herein described. I believe that it is sufficient for the purpose to state that the patent I have mentioned is evidence of the well known fact that yielding means for mounting the reflector is preferred, either to hold the lens in mounted position as well as to afford a means by which sealing of the reflector is accomplished, as shown in Fig. 1, or solely for the purpose of sealing the reflector and depending upon other means, as in Fig. 2, for the mounting of the lens on the body.

In either form of the invention as shown, or in any other embodiment thereof, it is also a desirable, but not essential feature, that the reflector be so shaped that its focal axis lies parallel with the body axis. For this purpose a reflector of the general type represented by Patent Number 1,963,608, as well as a reflector of the type represented by Patent Number 1,471,923, may be used. Therefore, it is obvious that a reflector adapted to take care of this angular placement of the lens is not within the field of the invention set forth herein, although it may partake of the forms mentioned, materially to the advantage of the lamp performance desired.

Having thus described my invention what I claim is:

1. An automobile lamp incorporating body and lens elements blending in exterior surface to produce a stream line shape, the line of demarcation between the body and lens occupying a plane lying at an angle inclined backward relatively to the axis of the lamp, the outer surface of said lens and said body adjacent thereto being substantially spherical, whereby the line of demarcation will be substantially circular.

2. An automobile lamp incorporating body and lens elements blending in exterior surface to produce substantial stream line shape, the line of demarcation between body and lens occupying a plane lying at an angle inclined backward relatively to the axis of the lamp, the lens being circular and the body adjacent to the line of demarcation being substantially spherical, whereby said line of demarcation will be substantially circular.

ROY W. JOHNSON.